(12) United States Patent
Delaporte

(10) Patent No.: US 11,861,087 B2
(45) Date of Patent: Jan. 2, 2024

(54) FLEXIBLE DISPLAY DEVICES WITH A FOLD OVER CAMERA WINDOW

(71) Applicant: Lepton Computing LLC, Brooklyn, NY (US)

(72) Inventor: Stephen E. Delaporte, New York, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 0 days.

(21) Appl. No.: 17/211,706

(22) Filed: Mar. 24, 2021

(65) Prior Publication Data

US 2021/0303092 A1    Sep. 30, 2021

Related U.S. Application Data

(60) Provisional application No. 62/994,174, filed on Mar. 24, 2020.

(51) Int. Cl.
| | |
|---|---|
| G06F 3/041 | (2006.01) |
| G06F 1/16 | (2006.01) |
| H04M 1/02 | (2006.01) |

(52) U.S. Cl.
CPC .......... G06F 3/0412 (2013.01); G06F 1/1618 (2013.01); G06F 1/1686 (2013.01); H04M 1/0268 (2013.01); *G06F 2203/04102* (2013.01)

(58) Field of Classification Search
CPC ......... G06F 2203/04102; G06F 1/1618; G06F 1/1652; G06F 1/1647; H04M 1/0268
See application file for complete search history.

(56) References Cited

U.S. PATENT DOCUMENTS 9,557,772 B1 *  1/2017  Xin ...................... G06F 1/1643
9,754,520 B2    9/2017  Kwon et al.
(Continued)

FOREIGN PATENT DOCUMENTS

| KR | 20230002466 A | 1/2023 |
| WO | 2021195292 A1 | 9/2021 |

OTHER PUBLICATIONS

International Preliminary Report on Patentability in Application No. PCT/US2021/023999 dated Sep. 22, 2022 (6 pps.).
(Continued)

*Primary Examiner* — Robin J Mishler
(74) *Attorney, Agent, or Firm* — Burns & Levinson, LLP; Joseph M. Maraia; Peter Stecher

(57) ABSTRACT

Foldable touch screen display devices with a flexible display including foldable segments to configure from a compact state to an expanded state, and a fold over camera window are described. The form factor of the compact state can be the size of a handheld phone. The form factor of the expanded state can be the size of a tablet computer, and can include the mechanical functionality of a laptop. Both states include an integrated speaker and microphone. The fold over camera window allows symmetrically folding so that edges of each segment are tangent with each other in a fully folded state. The device includes sensors indicating the state of configuration and mechanisms for alignment, locking, and further structural support. A module attached to at least one segment of the flexible display or rigid display contains all processing and memory, and a communications system to be used in any state.

23 Claims, 6 Drawing Sheets

(56) References Cited

U.S. PATENT DOCUMENTS

| | | | |
|---|---|---|---|
| 10,140,018 B2 | 11/2018 | Kim et al. | |
| 10,234,902 B2 | 3/2019 | Delaporte | |
| 10,542,128 B2 | 1/2020 | Kang et al. | |
| 2015/0338888 A1* | 11/2015 | Kim | G06F 1/1643 |
| | | | 345/156 |
| 2019/0033927 A1* | 1/2019 | Youm | G06F 1/1616 |
| 2020/0042133 A1* | 2/2020 | Park | G06F 1/1652 |
| 2021/0006719 A1* | 1/2021 | Newman | H04N 19/15 |
| 2021/0041917 A1 | 2/2021 | Moon et al. | |

OTHER PUBLICATIONS

International Preliminary Report on Patentability in Application No. PCT/US2021/023999 dated Sep. 22, 2022, 5 pages.
International Search Report and Written Opinion in Application No. PCT/US2021/023999 dated Jun. 29, 2021, 6 pages.

* cited by examiner

FLEXIBLE DISPLAY DEVICES WITH A FOLD OVER CAMERA WINDOW

REFERENCE TO RELATED APPLICATIONS

The present application claims priority to U.S. Patent Application No. 62/994,174, filed Mar. 24, 2020 and titled "FLEXIBLE DISPLAY DEVICES WITH A FOLD OVER CAMERA WINDOW," which is incorporated herein by reference in its entirety.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. Additionally, in such handheld computing devices as a touch screen mobile phone, the limited size of the display can significantly reduce the viewing capacity while watching videos, using graphic-intensive applications, and reading text. The rigid nature of a standard touch screen display can also limit the portability of a device when its form factor is in the larger size range for a phone, or at the scale of a tablet, which makes folding a desirable feature. With folding, use of a camera can also be limited due to the fact that it can potentially be covered when the device is in a folded state.

There is therefore a need for touch screen displays having increased size without sacrificing the convenience of a small device while also providing a camera configuration that can be used when a device is in a folded and unfolded state.

SUMMARY OF EMBODIMENTS OF THE INVENTION

To mitigate the difficulties associated with a small-scale touch screen, variations on flexible displays and the implementation of multiple screen displays have been proposed to enable the transformation of a display from a compact state to an expanded state. Although the use of flexible displays and multiple screen displays offer the advantages of a transformation in scale, there are still a number of limitations as to how they can be implemented. For example, when a device is in a folded state it can block the use of a camera module that would normally be used at the front face of the flexible display when it is situated in an unfolded state. In this case, an additional camera module would be required for use when the device is in a folded state, especially when there is a secondary display or portion of the original flexible display that is being used in the folded state. By having a fold over camera window through which the camera can still be used, an additional camera module is not needed. This provides allows for more space to be used in the device for other critical components, and it also reduces the overall cost of a foldable device.

There is a need for a computing device that can retain the form factor and functionality of a phone, while also providing a touch screen display that can be reconfigured from a compact state to an expanded state. Furthermore, there is a need for a fold over camera window to reduce the number of cameras needed for a foldable device to reduce cost and complexity, while also retaining a thinner, symmetrical. and ergonomically friendly form factor.

Foldable touch screen display devices with a flexible display made up of segments that can be folded from a compact state to an expanded state also include a fold over camera window. The form factor of the compact state is roughly the size of a typical handheld phone or smaller. The form factor of the expanded state is roughly the size of a larger phone or tablet computer, which may also include the mechanical functionality of a laptop. Both states may include an integrated speaker and microphone. The fold over camera window provides a way for the device to fold symmetrically or in such a way that the edges of each segment are tangent with each other when the device is in a fully folded state while also eliminating the need for an extra camera unit. The device may further include sensors to indicate the state of configuration and mechanisms for alignment, locking, and further structural support. In one embodiment, a module attached to, situated within, or otherwise associated with at least one segment of the flexible display or rigid display may contain all or substantially all processing and memory, along with a communications system, which may be used in any state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
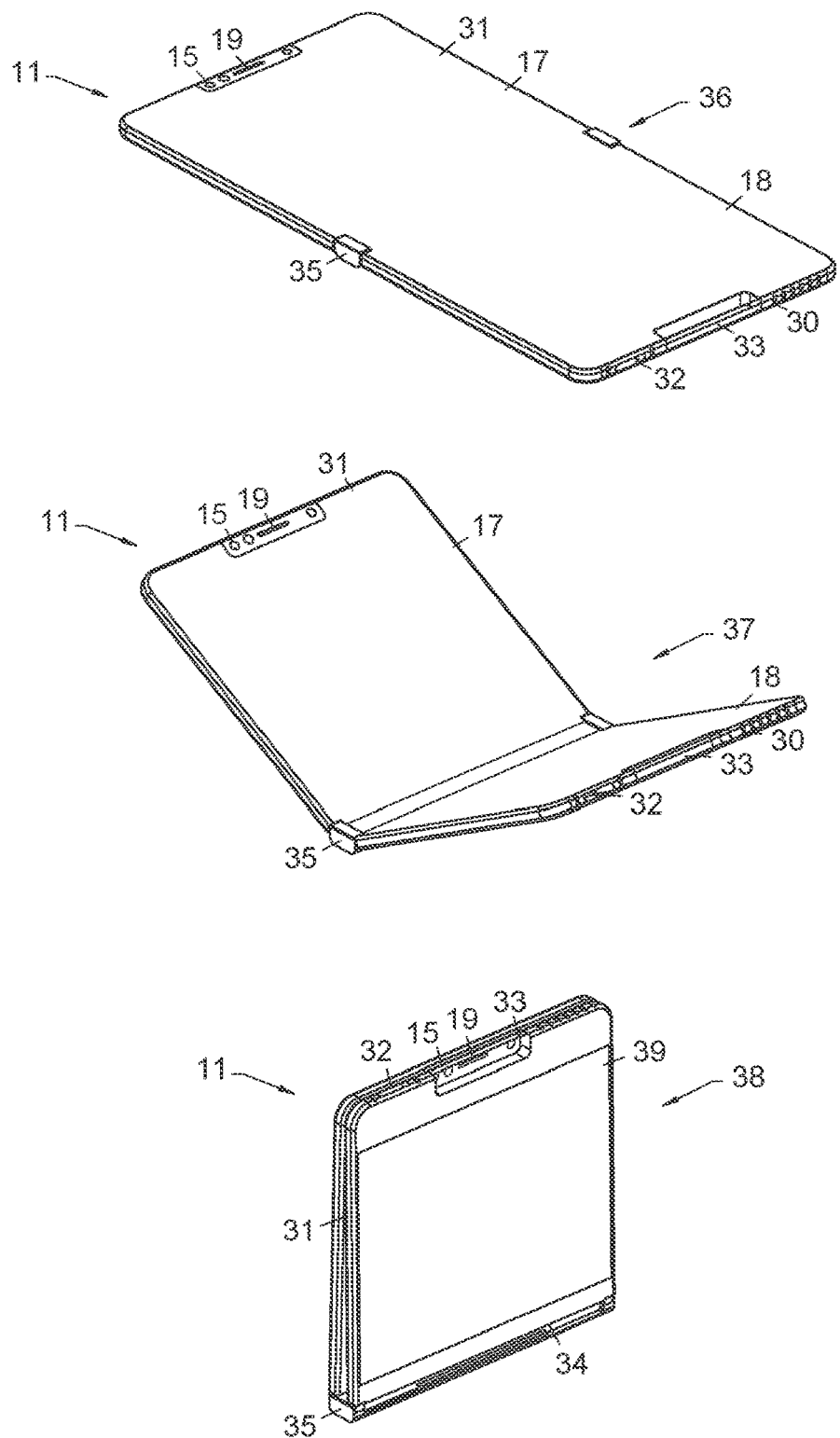
FIG. 1 is a diagram showing a folding sequence of a flexible display device transitioning from an expanded state to a compact state with a camera and sensor module on one side and a fold over camera window on the opposing side.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In accordance with the exemplary embodiment shown in FIG. 1, a foldable computing device 11 is shown with a first flexible display segment 31 and a second flexible display segment 18 that can both fold flat against each other through hinge 35, which is situated below and in between both segments. The diagram of FIG. 1 further illustrates a camera and sensor module 15 located at the edge of flexible display segment 31 which also includes a speaker 19. On the opposing side of the device where flexible display segment 18 is located, a fold over camera window 33 is situated along the edge with the same geometry as camera and sensor module 15, such that when the device is folded, as shown in position 38, the window 33 aligns with camera and sensor module 15 to provide transparency so that the camera and sensors from module 15 can maintain functionality when the device is in a folded state. The window can be made from a transparent material such as glass or acrylic, but it also may be just an opening absent of any material. In the first position 36, foldable computing device 11 is shown in an unfolded state where camera and sensor module 15 are positioned along the same surface plane as fold over camera window 33. The middle position 37 shows foldable computing device 11 in a partially folded state where its peripheral port 32 and microphone and speaker openings 37 are more fully shown at the base of the device. To allow for speaker 19 to be accessed when the device in a compact state as shown is position 38, a small opening at the center of camera window 33 could also be integrated so that the device could be used as a handheld phone when it is in a folded state.

Figure 2:
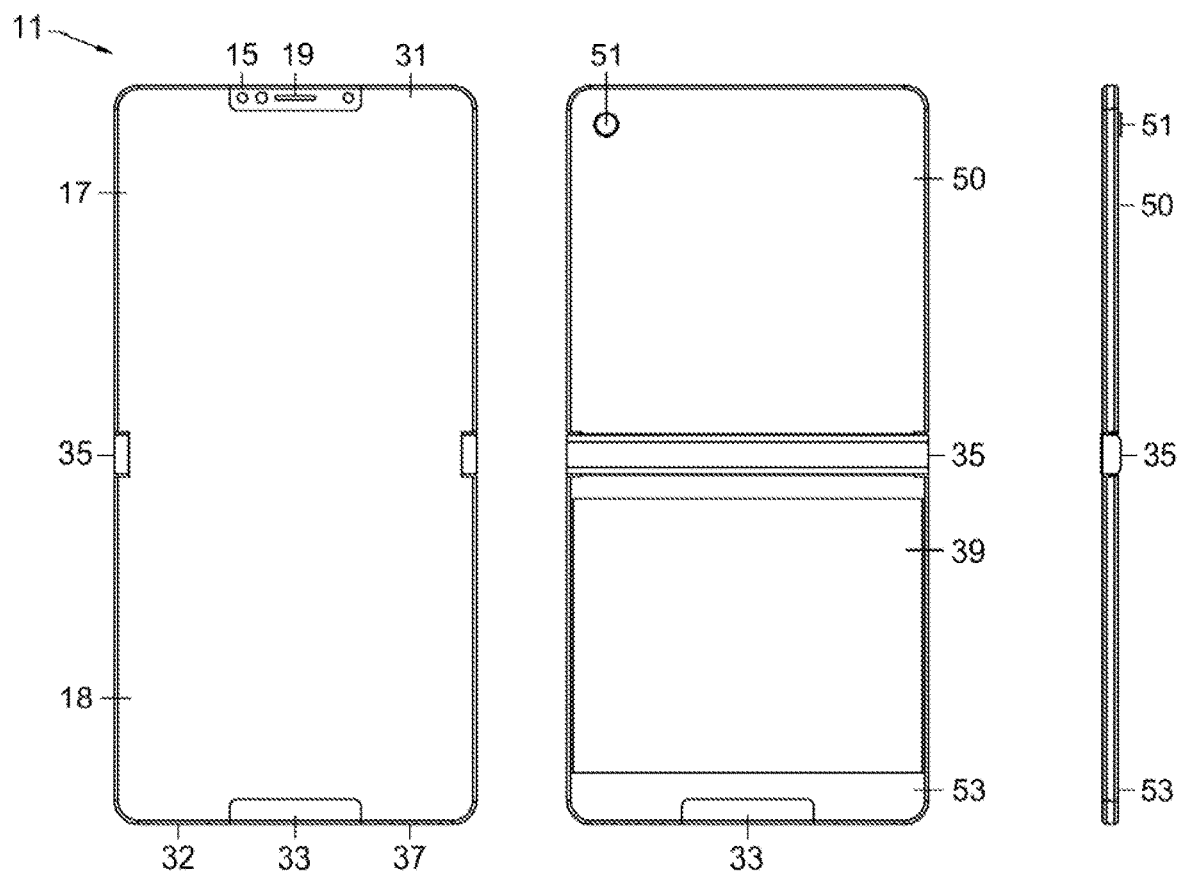
FIG. 2 is a front, back, and side view showing the flexible display device from FIG. 1 in an unfolded state.
Figure 3:
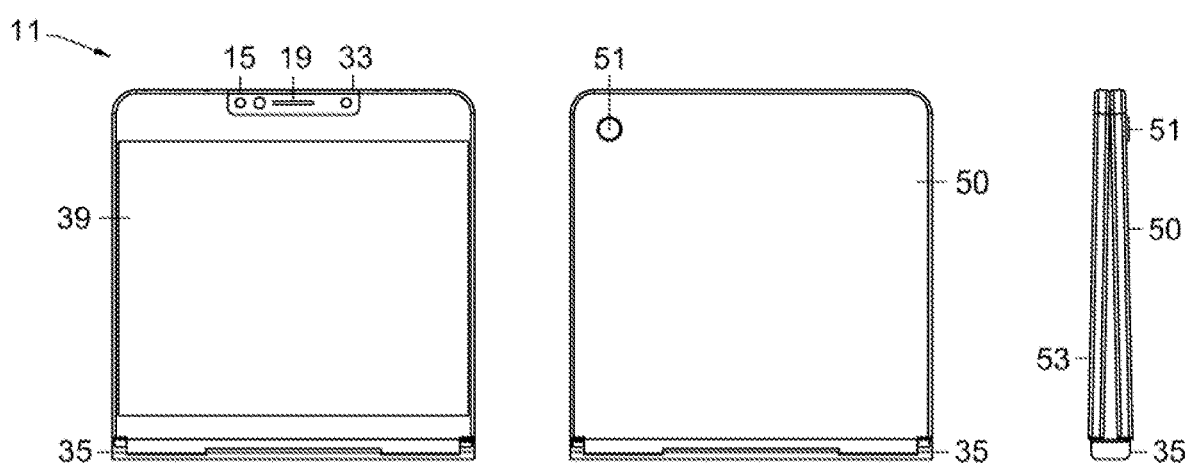
FIG. 3 is a front, back, and side view showing the flexible display device from FIG. 2 in a folded state where the fold over window is tangent against the opposing side's camera and sensor module.

The features of foldable computing device 11 are further shown in FIG. 2 through a front, back, and side view. A rigid display 39 may be integrated at the back side of the device so that it can still be used as a phone or for notifications and other applications when foldable computing device 11 is in a folded state. An additional camera 51 is integrated at the back side of flexible display segment 17 so that it can be used when the device is unfolded or folded. FIG. 3 shows a front, back, and side view of foldable computing device 11 in a folded state to emphasize how the fold over camera window 33 aligns in front of camera and sensor module 15.

Figure 4:
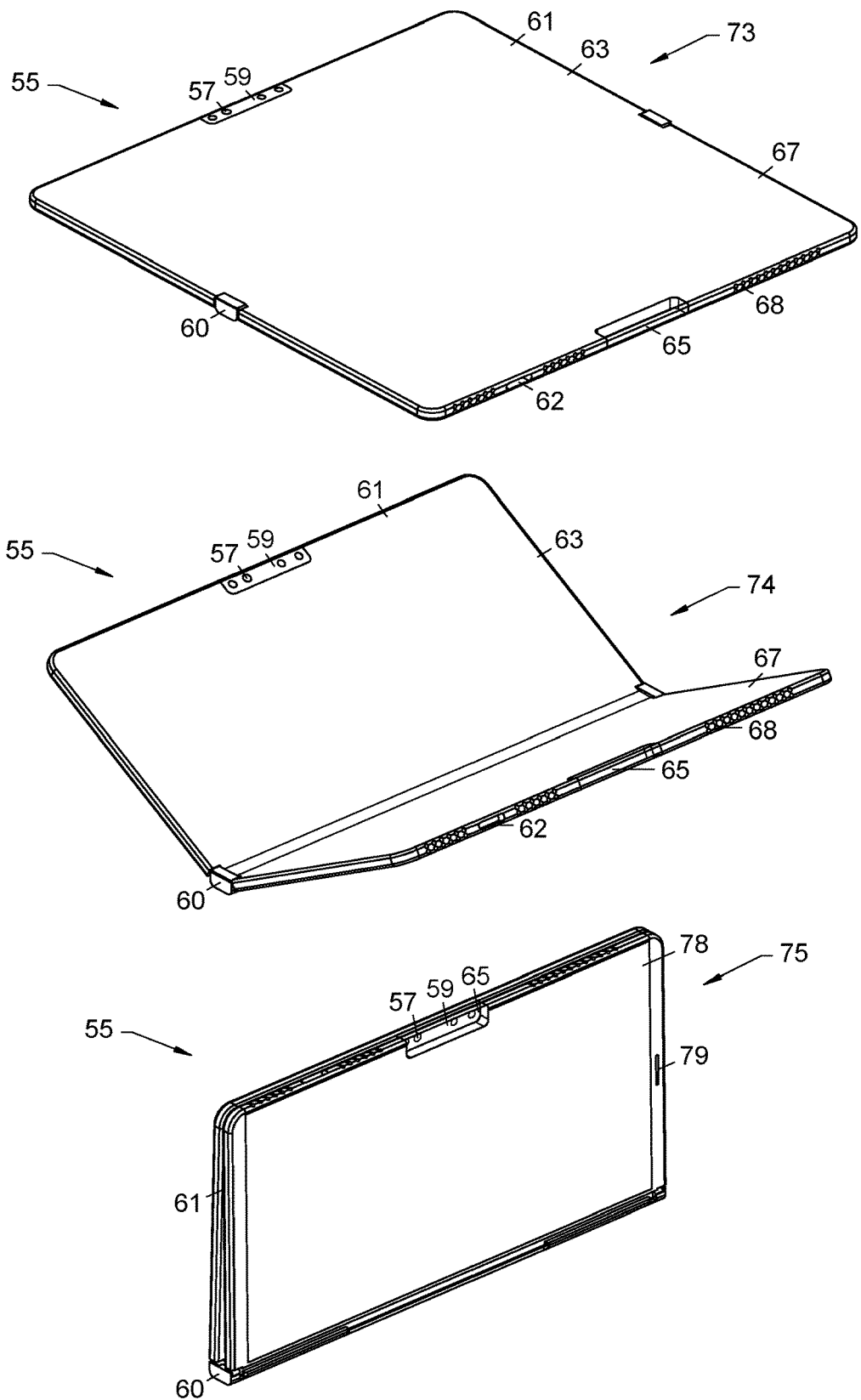
FIG. 4 is a diagram showing a folding sequence of a larger version of the flexible display device shown in FIG. 1 transitioning from an expanded state to a compact state with a camera and sensor module on one side and a fold over camera window on the opposing side.
Figure 5:
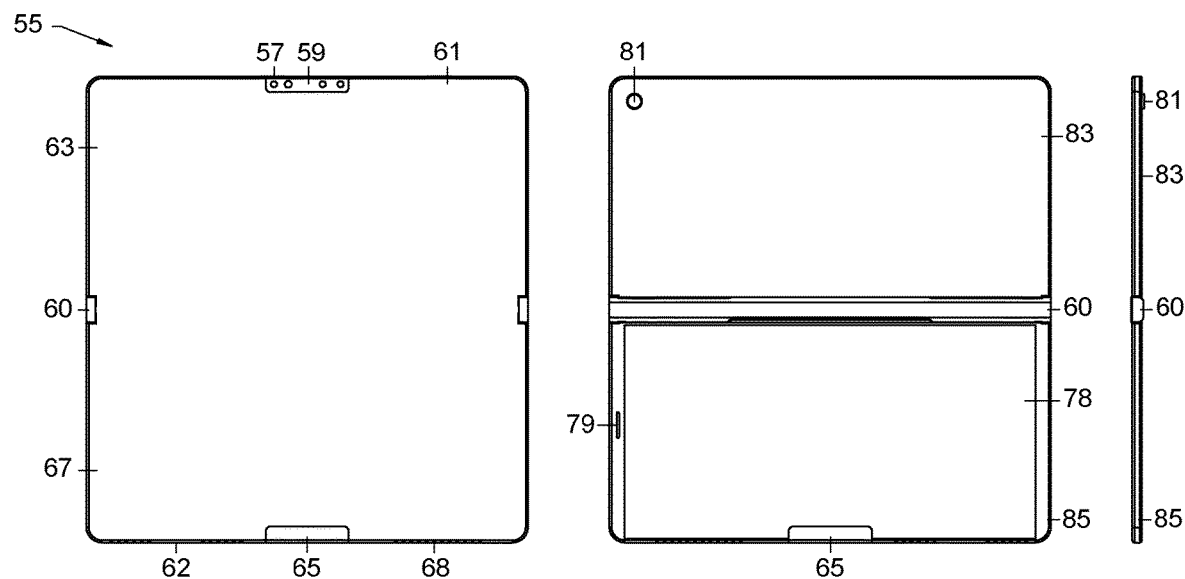
FIG. 5 is a front, back, and side view showing the flexible display device from FIG. 4 in an unfolded state.
Figure 6:
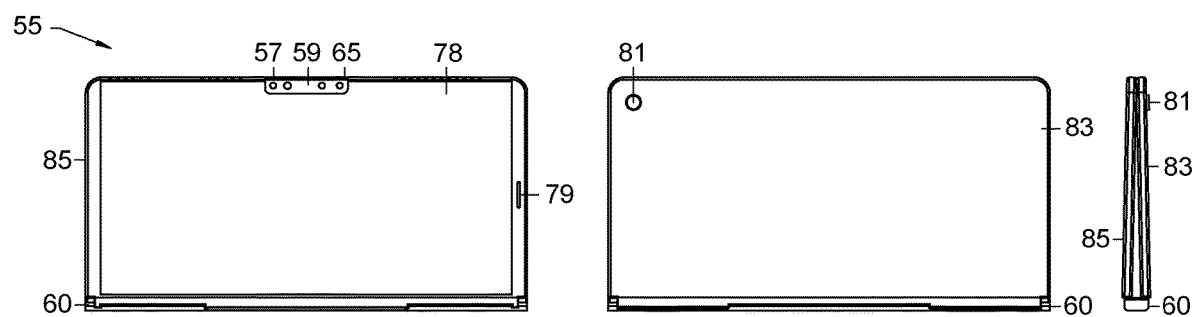
FIG. 6 is a front, back, and side view showing the flexible display device from FIG. 5 in a folded state where the fold over window is tangent against the opposing side's camera and sensor module.

FIG. 4 is a diagram showing a folding sequence of foldable computing device 55, which is similar to folding computing device 11 from FIG. 1, in that is has a similar camera and sensor module 57 with a fold over camera window 65 on the opposite side. In the case of foldable computing device H, a flip phone form factor configuration is implemented, whereas m FIG. 4, a form factor with a larger tablet form factor is implemented and shown in an expanded state from position 73 where flexible display segments 61 and 67 of flexible display 63 can fold against each other through hinge 60 such that the device can transition into a handheld phone configuration as shown in its transitional partially folded position 74 and then in its final folded position 75. Rigid display 78 and speaker 79 are also shown on the back side of foldable computing device 55 which further illustrates how the device can be used with a phone form factor in its folded state. Another embodiment that could utilize the fold over camera window is for a flexible display device that is able to fold having its two structural segments facing each other in the folded state while its display segments are facing outward such that one of the flexible display segments can still be used to view the camera application. The window itself does not have to be limited to the position it is shown within the embodiments. It could also be located offset from the edge and in other shapes such as a circle to align with the circular geometry of the camera. Various other shapes could be implemented as well.

Similar to FIGS. 2 & 3, FIGS. 5 & 6 each show a front, back, and side view of the foldable computing device 55 in the unfolded state and folded state to further illustrate its core features. Additionally, just as foldable computing device 11 from FIGS. 2 & 3 show the additional camera 51 on the back side of structural segment 50, which is opposite structural segment 53, in FIGS. 5 & 6 an additional camera 81 is included on the back side of structural support 83, which is opposite structural support 85 on foldable computing device 55.

Figure 7:
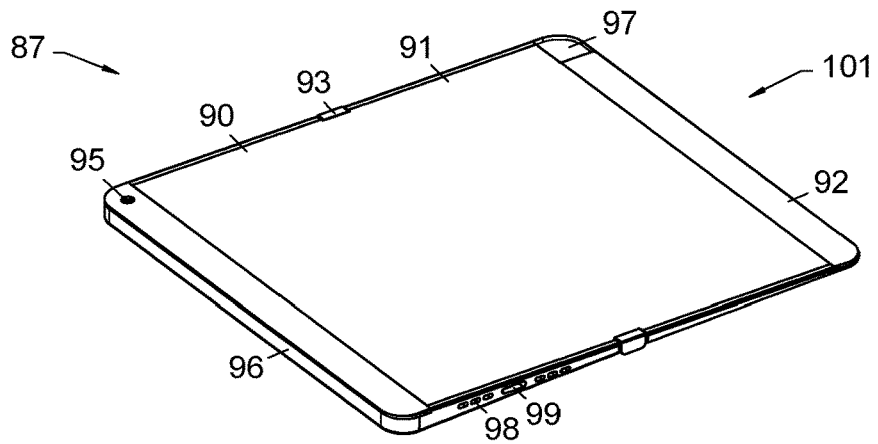
FIG. 7 is a diagram showing a folding sequence of a flexible display device transitioning from an expanded state to a compact state with a camera and sensor module on one side and a fold over camera window on the opposing side.
Figure 7:
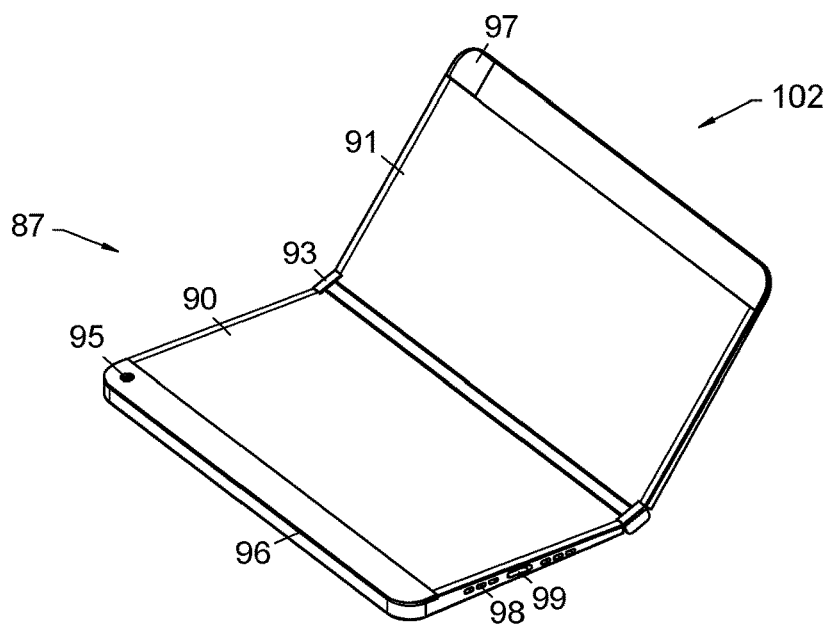
Figure 7:
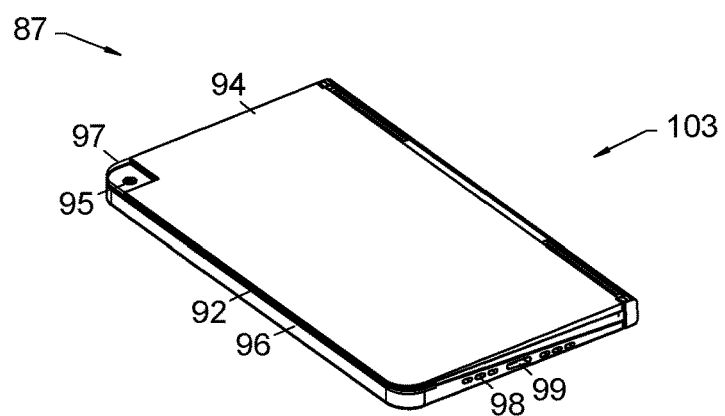
Figure 8:
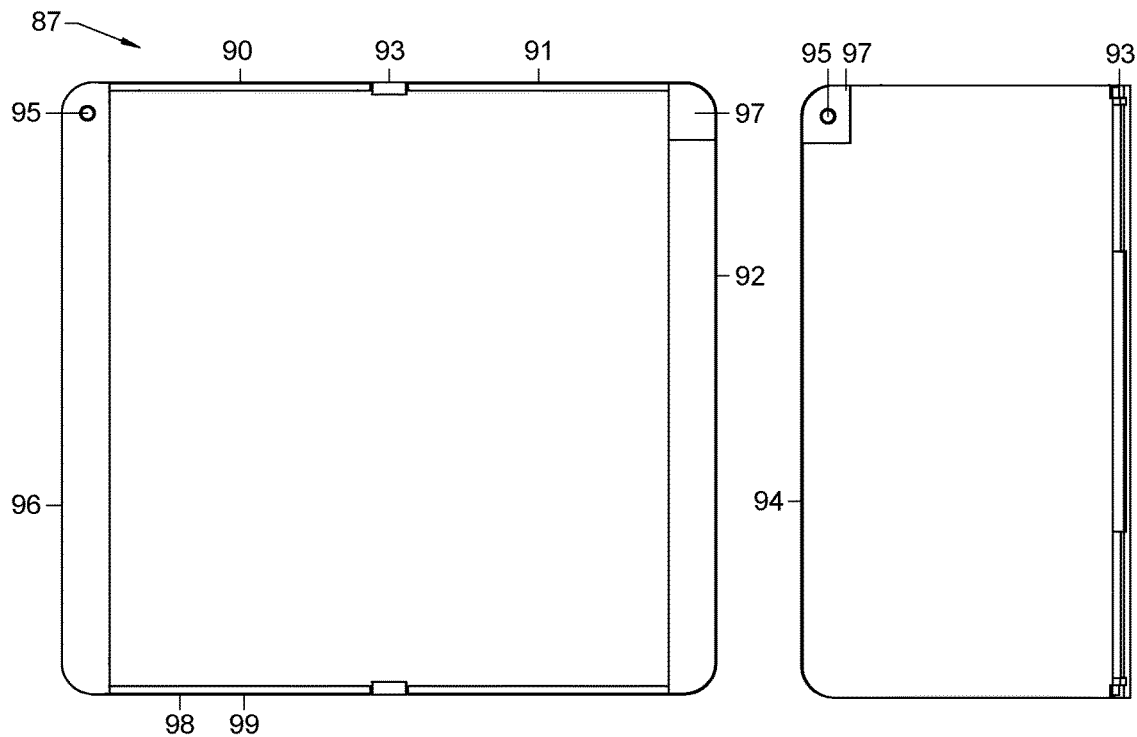
FIG. 8 is a front view showing the flexible display device from FIG. 7 in an unfolded state to the left side and in a folded state on the right side.
Figure 9:
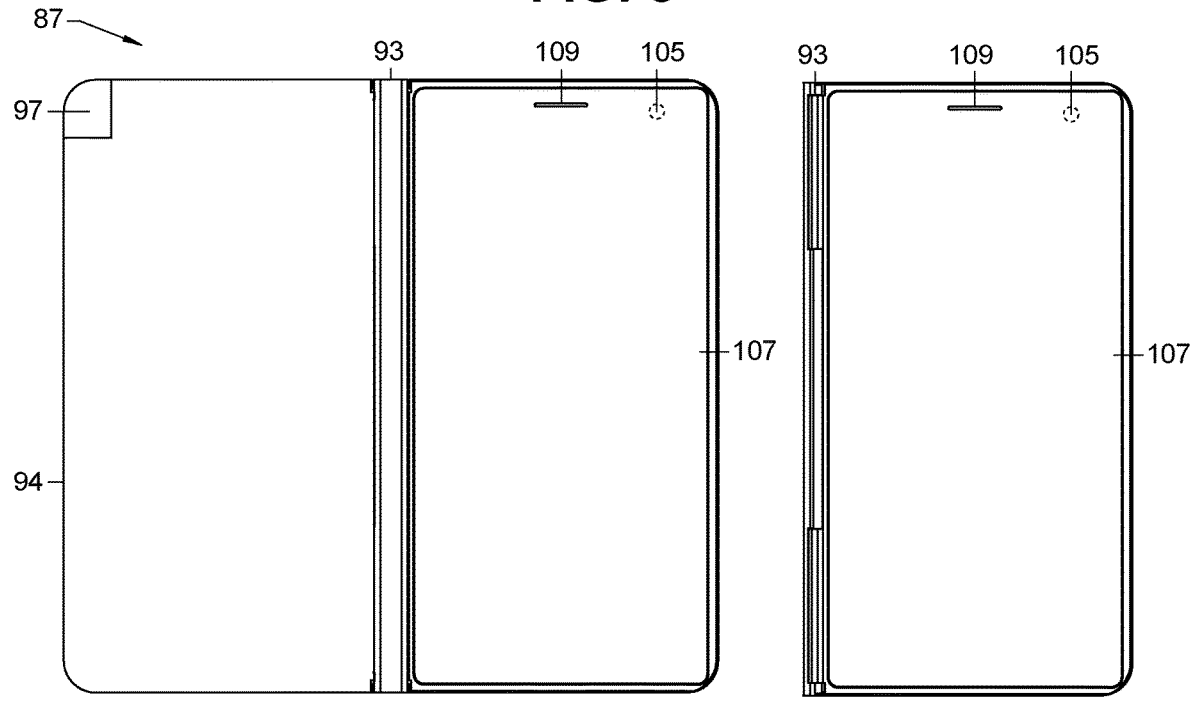
FIG. 9 is a back view showing the flexible display device from FIG. 7 in an unfolded state to the left side and in a folded state on the right side.

FIGS. 7-9 show a third embodiment with foldable computing device 87 transitioning from an unfolded tablet state in position 101 to a partially folded state in position 102 and then to a folded phone state in position 103, where fold over camera window 97 is instead situated at the corner of the device along edge 92 next to flexible display segment 91 so that it can fold over the camera and sensor module 95 located along edge 96 next to flexible display segment 90 through hinge 93. This provides transparency and functionality when the foldable computing device 87 is configured into a folded state, as shown in position 103. This ultimately allows camera and sensor module 95 to be used in the unfolded tablet state and the folded phone state. Similar to foldable computing devices 11 and 55, foldable computing device 87 also has an additional camera 105 which is situated on the same face as rigid display 107 where speaker 109 is also located.

The flexible display integrated with foldable computing device 11 may also be implemented with different aspect ratios beyond what is shown in the drawings and through different types of flexible display technologies. The ratios may include ranges that would result in a rectangular unfolded state shape when the flexible display segments are approximately square in shape, as is illustrated with segments 17 and 18 in FIG. 3 and a square unfolded state shape, when flexible display segments are rectangular in shape, as is shown with segments 61 and 67, and 90 and 91 from FIGS. 5 and 8. These aspect ratios may range from approximately 22:9 to 1:1 and are applicable to the full flexible display, the segments that make up the flexible display, and the rigid display as well. The flexible display technology may include, but is not limited to OLED, Mini-LED, and Micro-LED technology.

What is claimed is:

1. An apparatus comprising:
   (a) a rigid touch-sensitive display; wherein the rigid touch-sensitive display is attached to a first structural support segment;
   (b) a flexible touch-sensitive display comprising a first flexible touch-sensitive display portion and a second flexible touch-sensitive display portion; wherein:
      (1) the first flexible touch-sensitive display portion is attached to the first structural support segment;
      (2) the second flexible touch-sensitive display portion is attached to a second structural support segment;
      (3) the flexible touch-sensitive display further comprises having a hilly folded state;
      (4) the flexible touch-sensitive display further comprises having a partially expanded state; and
      (5) the flexible touch-sensitive display further comprises having a fully expanded state; and
   (c) a first camera and a speaker; wherein the first camera and the speaker are attached to the front surface of the second structural support segment such that the first camera and the speaker are situated on the same side as the second flexible display portion and positioned approximately in the center region along the peripheral short side of the second structural support segment:
   (d) a second camera different from the first camera; wherein the second camera is attached to the back surface of the second structural support segment such that it is situated on the opposite side of the second flexible display portion and positioned approximately in the peripheral corner region of the second structural support segment; and
   (e) a window and an opening in the window are integrated with the first structural support segment such that the window and the first camera are aligned and overlap with each other when the device is positioned in the folded state and the opening in the window and the speaker are aligned and overlap with each other when the device is in the folded state: wherein the rigid touch-sensitive display is operable with the first camera and the second camera when the device is positioned in the folded state, and the flexible touch-sensitive display is operable with the first camera and the second camera when the device is positioned in the expanded state.

2. The apparatus of claim 1 wherein:
the first camera includes sensors situated along the same face of the structural support segment that the first camera is integrated with; and
the window area covers the same area of the first camera and the sensors such that the first camera and the sensors are unobstructed when the device is in a folded state.

3. The apparatus of claim 1 wherein:
the window is made up of a transparent material.

4. The apparatus of claim 1 wherein:
the window is an opening in the first structural support segment that it is integrated with which is absent of material.

5. The apparatus of claim 1 wherein:
the window is located along at least one edge of the first structural support segment that it is integrated with such that the edge of the window is tangent with the edge of the first structural support segment.

6. The apparatus of claim 1 wherein:
the window is located offset from at least one edge of the first structural support segment that it is integrated with such that there is a structural frame between the edge of the first structural support segment and the edge of the window.

7. The apparatus of claim 1 wherein:
the window has a circular shape.

8. The apparatus of claim 1 wherein:
the window has a rectilinear shape.

9. The apparatus of claim 1 wherein:
the window has a curvilinear shape.

10. The apparatus of claim 1 wherein:
the window is situated at the corner of the first structural support segment that it is integrated with.

11. The apparatus of claim 1 wherein:
the fully folded state comprises a fully folded angle betureen the first flexible touch-sensitive display portion and the second flexible touch-sensitive display portion that is less than 10 degrees; and
the fully expanded state comprises a fully expanded angle between the first flexible touch-sensitive display portion and the second flexible touch-sensitive display portion that is between 170 and 190 degrees; and
the partially expanded state comprises an angle that falls between the fully folded state and the fully expanded state.

12. The apparatus of claim 1 wherein:
the rigid touch-sensitive display is situated on the back side the first structural support segment such that the rigid touch-sensitive display is facing opposite the direction of first touch-sensitive display portion.

13. An apparatus comprising:
   (a) a rigid touch-sensitive display; wherein the rigid touch-sensitive display is attached to a first structural support segment;
   (b) a flexible touch-sensitive display comprising a first flexible touch-sensitive display portion and a second flexible touch-sensitive display portion; wherein:
      (1) the first flexible touch-sensitive display portion is attached to the first structural support segment;

(2) the second flexible touch-sensitive display portion is attached to a second structural support segment;
(3) the flexible touch-sensitive display further comprises having a fully folded state;
(4) the flexible touch-sensitive display further comprises having a partially expanded state; and
(5) the flexible touch-sensitive display further comprises having a fully expanded state; and (c) a first camera and a speaker, wherein the first camera and the speaker are attached to the front surface of the first structural support segment such that the first camera and the speaker are situated on the same side as the first flexible display and positioned approximately in the center region along the peripheral short side of the first structural support segment;

(d) a second camera different from the first camera, wherein the second camera is attached to the back surface of the first structural support segment such that it is situated on the same side as the rigid touch-sensitive display and the opposite side of the first flexible display portion and positioned approximately in the peripheral corner region of the first structural support segment; and (e) a window and an opening in the window are integrated with the second structural support segment such that the window and the first camera are aligned and overlap with each other when the device is positioned in the folded state and the opening in the window and the speaker are aligned and overlap with each other when the device is in the folded state, wherein the rigid touch-sensitive display is operable with the first camera and the second camera when the device is positioned in the folded state, and the flexible touch-sensitive display is operable with the first camera and the second camera when the device is positioned in the expanded state.

14. The apparatus of claim 13 wherein:
the first camera includes sensors situated along the same face of the structural support segment that the first camera is integrated with; and
the window area covers the same area of the first camera and the sensors such that the first camera and the sensors are unobstructed when the device is in a folded state.

15. The apparatus of claim 13 wherein:
the window is made up of a transparent material.

16. The apparatus of claim 13 wherein:
the window is an opening in the second structural support segment that it is integrated with which is absent of material.

17. The apparatus of claim 13 wherein:
the window is located along at least one edge of the second structural support segment that it is integrated with such that the edge of the window is tangent with the edge of the second structural support segment.

18. The apparatus of claim 13 wherein:
the window is located offset from at least one edge of the second structural support segment that it is integrated with such that there is a structural frame between the edge of the second structural support segment and the edge of the window.

19. The apparatus of claim 13 wherein:
the window has a circular shape.

20. The apparatus of claim 13 wherein:
the window has a rectilinear shape.

21. The apparatus of claim 13 wherein:
the window has a curvilinear shape.

22. The apparatus of claim 13 wherein:
the window is situated at the corner of the structural support segment that it is integrated with.

23. The apparatus of claim 13 wherein:
the fully folded state comprises a fully folded angle between the first flexible touch-sensitive display portion and the second flexible touch-sensitive display portion that is less than 10 degrees; and
the fully expanded state comprises a fully expanded angle between the first flexible touch-sensitive display portion and the second flexible touch-sensitive display portion that is between 170 and 190 degrees; and
the partially expanded state comprises an angle that falls between the fully folded state and the fully expanded state.

* * * * *